United States Patent [19]
Bedi et al.

[11] Patent Number: 4,897,095
[45] Date of Patent: Jan. 30, 1990

[54] WATER ENTRAPMENT DEVICE

[75] Inventors: Ram D. Bedi, Birmingham; Donald T. Benedyk, Brighton, both of Mich.

[73] Assignee: 2V Industries, Inc., Wixom, Mich.

[21] Appl. No.: 284,302

[22] Filed: Dec. 14, 1988

[51] Int. Cl.$^4$ .............................................. B01D 50/00
[52] U.S. Cl. ........................................ 55/279; 55/321; 55/440
[58] Field of Search ................ 55/279, 320, 321, 322, 55/440–446

[56] References Cited

U.S. PATENT DOCUMENTS

| | | | |
|---|---|---|---|
| 3,017,239 | 1/1962 | Rodman | 55/279 X |
| 4,300,918 | 11/1981 | Cary | 55/1 |
| 4,630,530 | 12/1986 | Eckstrom et al. | 55/279 X |
| 4,702,753 | 12/1987 | Kowalczyk | 55/279 X |

FOREIGN PATENT DOCUMENTS

| | | | |
|---|---|---|---|
| 0021466 | 2/1978 | Japan | 55/440 |
| 1111797 | 9/1984 | U.S.S.R. | 55/440 |

*Primary Examiner*—Charles Hart
*Attorney, Agent, or Firm*—Basile and Hanlon

[57] ABSTRACT

A water entrapment device is provided, the device comprising a housing having an opening at the front and back, and an entrapment portion disposed within the housing. The entrapment portion comprises at least one screen covering the front opening, at least one entrapment member behind the screen, and an absorbent member behind the entrapment member. The device further comprises a water collecting surface and a drain.

1 Claim, 1 Drawing Sheet

U.S. Patent
Jan. 30, 1990
4,897,095
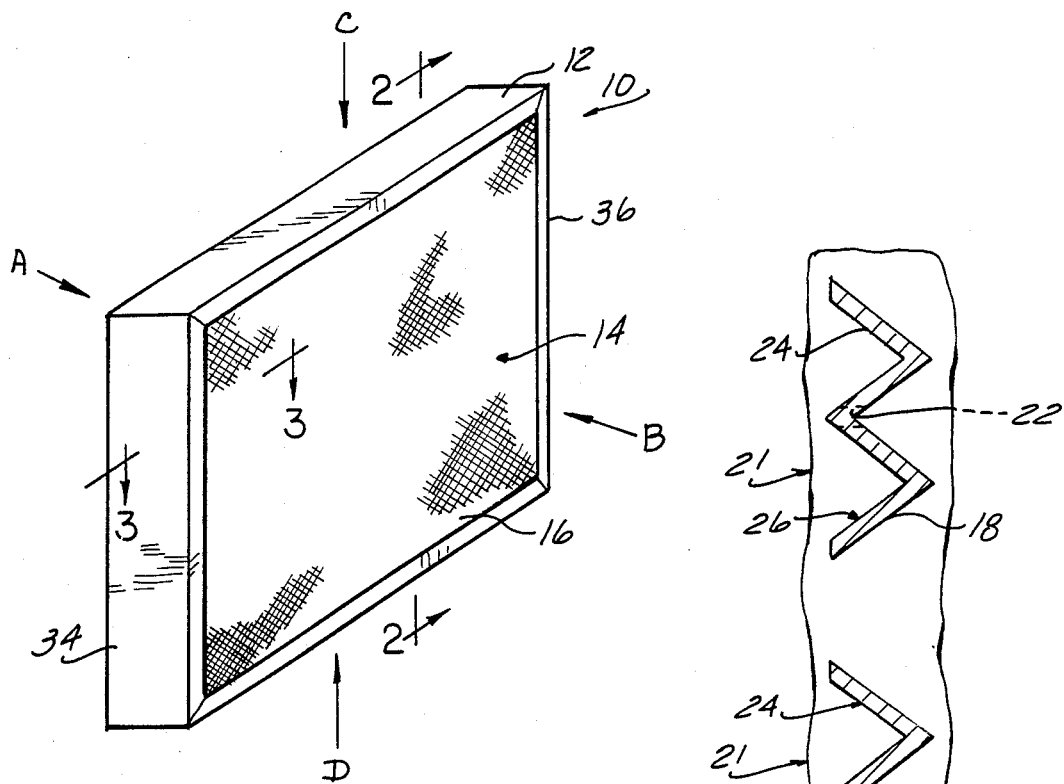
FIG-1
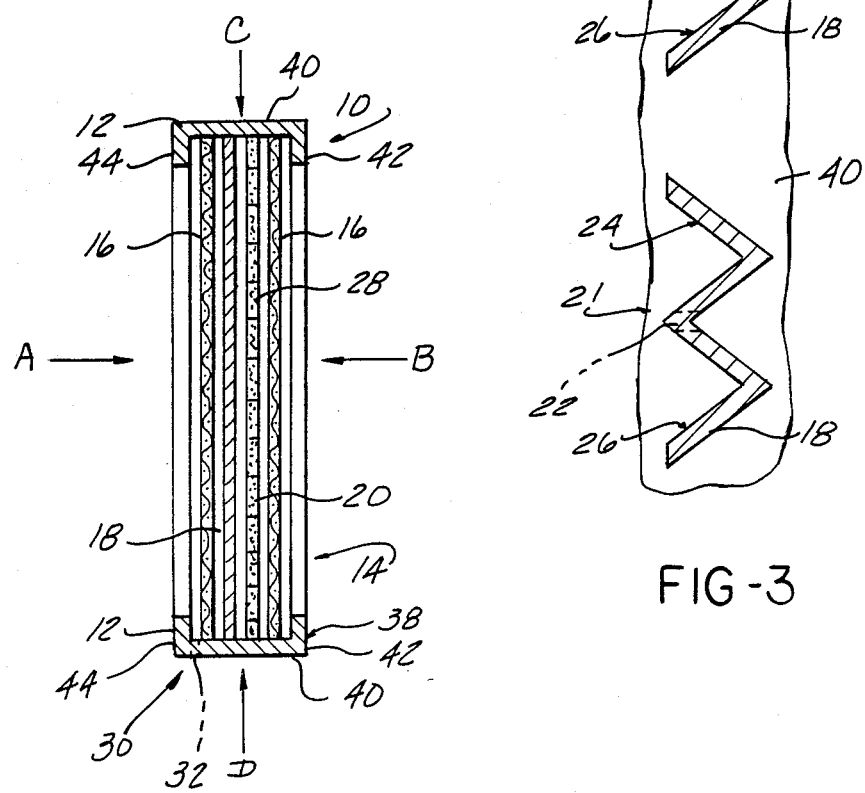
FIG-2
FIG-3

WATER ENTRAPMENT DEVICE

BACKGROUND OF THE INVENTION

1. Field of the Invention

The present invention generally relates to water entrapment and, more particularly, is concerned with a water entrapment device which may be used in automobiles.

2. Description of the Related Art

In recent years, the use of air conditioning units in automobiles has become increasingly common. Especially in warmer climates, air conditioning in a car has become almost a necessity. As a result of this, the car industry is continually trying to improve automobile air conditioners.

One problem encountered is that air conditioning condensers have become so efficient that they are actually forming water which is being projected into the passenger compartment of the vehicle. Obviously, this is an unwanted side effect which can damage the passenger compartment and cause the passengers much agitation. In addition, water in the vehicle will promote the growth of bacteria, molds and yeast, which will impart an unpleasant odor in the vehicle and can cause allergic reactions in the passengers. Consequently, a need exists for a water entrapment device which will keep any water out of a vehicle's passenger compartment. This device should be simple and cost efficient. It would also be preferable if the device had no mechanically moving parts and required little or no maintenance.

SUMMARY OF THE INVENTION

The present invention provides a water entrapment device designed to satisfy the needs outlined above. The device comprises a housing which has an opening on the front and back of the device. An entrapment portion is attached within the housing, the entrapment portion comprising at least one screen, a plurality of entrapment members, and an absorbent member. Each of the members of the entrapment portion are attached to the top and bottom of the housing. The screen is attached within the housing adjacent to the front of the device. A plurality of entrapment members are attached within the housing behind the screen. An absorbent member is attached within the housing behind the entrapment member. A second screen may be attached within the housing behind the absorbent member. The device further comprises a draining means for disposing of the collected water.

This water entrapment device effectively removes substantially all water entrapped in air flowing through the device without, at the same time, significantly dropping the air pressure. The invention has not mechanically moving parts and will require no maintenance. The device is simple and, therefore, can be cost efficiently incorporated into a vehicle.

BRIEF DESCRIPTION OF THE DRAWINGS

FIG. 1 is a perspective view of the water entrapment device of the present invention;

FIG. 2 is a cross-sectional view taken along line 2—2 in FIG. 1; and

FIG. 3 is an enlarged cross-section of the entrapment portion showing only the entrapment members of the present invention taken along line 3—3 in FIG. 1.

DETAILED DESCRIPTION OF THE PREFERRED EMBODIMENTS

Referring now to FIG. 1, there is shown a water entrapment device designated 10. For clarity, the front of device 10 has been designated A, and the back of device 10 has been designated B. The top of device 10 has been designated C and the bottom has been designated D. Air flowing through the device 10 enters the front A and exits through the back B. Device 10 comprises a housing 12 which has rectangular openings at the front A and back B. The housing 12 may be made of any suitable material and of any configuration. In the preferred embodiment, the housing 12 encloses entrapment portion 14 on all four sides, and has large rectangular openings at front A and back B. Entrapment portion 14 is disposed within the housing, and comprises a screen 16, an entrapment member 18, and an absorbent member 20. The members of the entrapment portion 14 are shown spaced in FIG. 2 for clarity, but it is to be understood that these members may be in registry with one another.

Referring now to FIG. 2, there is shown a cross sectional view of the entrapment portion 14 within the housing 12. In cross section, the top of housing 12 resembles an upside down U shape. The bottom of housing 12 resembles an upright U shape. Both U-shapes are comprised of a central planar portion 40 with two dependent side flanges 42, 44. Screen 16 runs from one side of the housing to the other, and covers the opening of the housing 12 located at the front A of device 10. The screen 16 may be made of any suitable material which will aid in trapping water. In the preferred embodiment, the screen 16 is composed of a tin plated aluminum having a mesh size of approximately $\frac{1}{4}$ inch. As air flows through the mesh, some of the moisture entrapped in the air will be caught by the aluminum screen 16. The tin plating on the screen 16 is a natural preservative and will retard the growth of bacteria in the airflow. It may be desired to use a plurality of screens 16 at the front A, depending upon a user's need for entrapment capabilities, weight, and cost.

Directly behind screen 16 are a plurality of vertically extending, co-planar arranged, entrapment members 18, as shown in FIGS. 2 and 3. These members are attached to housing 12 at the top C and bottom D, and are spaced a predetermined distance apart, running essentially from one side 34 of device 10 to the other side 36. FIG. 3 shows only a representative number of entrapment members 18. The number of these entrapment members 18 and the spacing therebetween is determined such that there is maximum entrapment capacity with least pressure drop of the air flowing through device 10.

The preferred configuration of each entrapment member 18 is a W shape, as shown in FIG. 3. The entrapment member 18 functions in the following way. The air will be hitting entrapment member 18 from the front side, as shown by arrow 21. A plurality of apertures 22 are formed at the central point of the W shape of entrapment member 18, spaced from top to bottom of member 18. The size and number of apertures 22 will similarly be determined such that there is maximum entrapment capacity with least pressure drop. In the preferred embodiment, these apertures 22 are the size of a pin hole. When the air hits entrapment member 18, it will seek the area of least resistance. Since sections 24 and 26 of W shaped entrapment member 18 have equal resistances, the air will divide equally, half going toward section 24 and half going toward section 26. This creates convective flow with the air on both sides of the W shape flowing in a circular pattern. Due to a flow's natural affinity to a solid surface, water entrapped in the air will adhere to sections 24, 26, and air passing through apertures 22 will be substantially free from droplets of water entrapped in the air. The material chosen for entrapment member 18 should be lightweight, inexpensive, slippery and non-absorbent, in order that the water collected will drain downward naturally. In the preferred embodiment, nylon is the selected material for entrapment member 18.

Referring again to FIG. 2, behind entrapment member 18 within the housing is absorbent member 20. Member 20 is disposed within housing 12, and runs essentially from side 34 to side 36 of device 10. This absorbent member 20 should be chosen from a material which can absorb any incidental moisture passing through entrapment member 18. Examples of this material are wool, cotton and other fabrics, which have a high absorptivity rate per pound of material. Also, absorbent member 20 may contain a solid biocide 28 embedded in the fiber. Biocide 28 is selectively chosen to counteract various microbial organisms. In the preferred embodiment, isothiazoline is chosen since it is exceptionally effective in combatting mold and yeast, the common organisms which could grow in moisture trapped in an automobile's duct work. Absorbent member 20 should not approach saturation since most of the water will be caught by entrapment member 18. Whatever moisture does accumulate in absorbent member 20 will be pulled toward bottom D of device 10 by gravity.

The water caught by entrapment member 18 will flow down the surface of entrapment member 18 toward the bottom of the housing 12. Likewise, any water caught by screen 16 and absorbent member 20 will accumulate at the bottom. Thus, a means 38 for collectin the water must be provided. This may comprise a tray (not shown) at the bottom of housing 12 or, as depicted in FIG. 2, the bottom of housing 12 itself may serve as a tray. In either event, means 30 for draining are provided. In the preferred embodiment, draining means 30 comprises an aperture 32 formed in the bottom of housing 12, the draining means 30 being in fluid communication with the collecting means 38.

As shown in FIG. 2, a second screen 16 or plurality of screens 16 may be provided, attached in similar manner to housing 12 behind absorbent member 20. This second screen 16 would give additional backup entrapment and biocidal capabilities.

Thus, what has been disclosed is a water entrapment device which is cost efficient, has no mechanical moving parts and requires no maintenance, will not significantly cause the air pressure to drop and, in addition, will act as a preservative. It is to be understood that the foregoing descriptionn is merely exemplary and not limitative and the true scope of the invention is that defined in the following claims.

What is claimed is:

1. A water entrapment device comprsing:

a housing having a closed top, bottom, and sides, the housing having a front opening and a back opening;

an entrapment portion disposed within the housing, the entrapment portion comprising;

a tin plated aluminum mesh screen covering the front opening;

a plurality of vertically spaced, co-planar arranged W-shaped entrapment members disposed behind the screen, the entrapment members having a plurality of apertures formed in the central point of the W shape, the apertures running from top to bottom of the entrapment member; and an absorbent member disposed behind the entrapment members, the absorbent member containing solid biocide;

a water collecting tray disposed beneath the entrapment portion in the housing; and a drain aperture formed in the bottom of the housing in fluid communication with the water collecting tray.

* * * * *